H. W. SPRATT.
Voting-Apparatus.

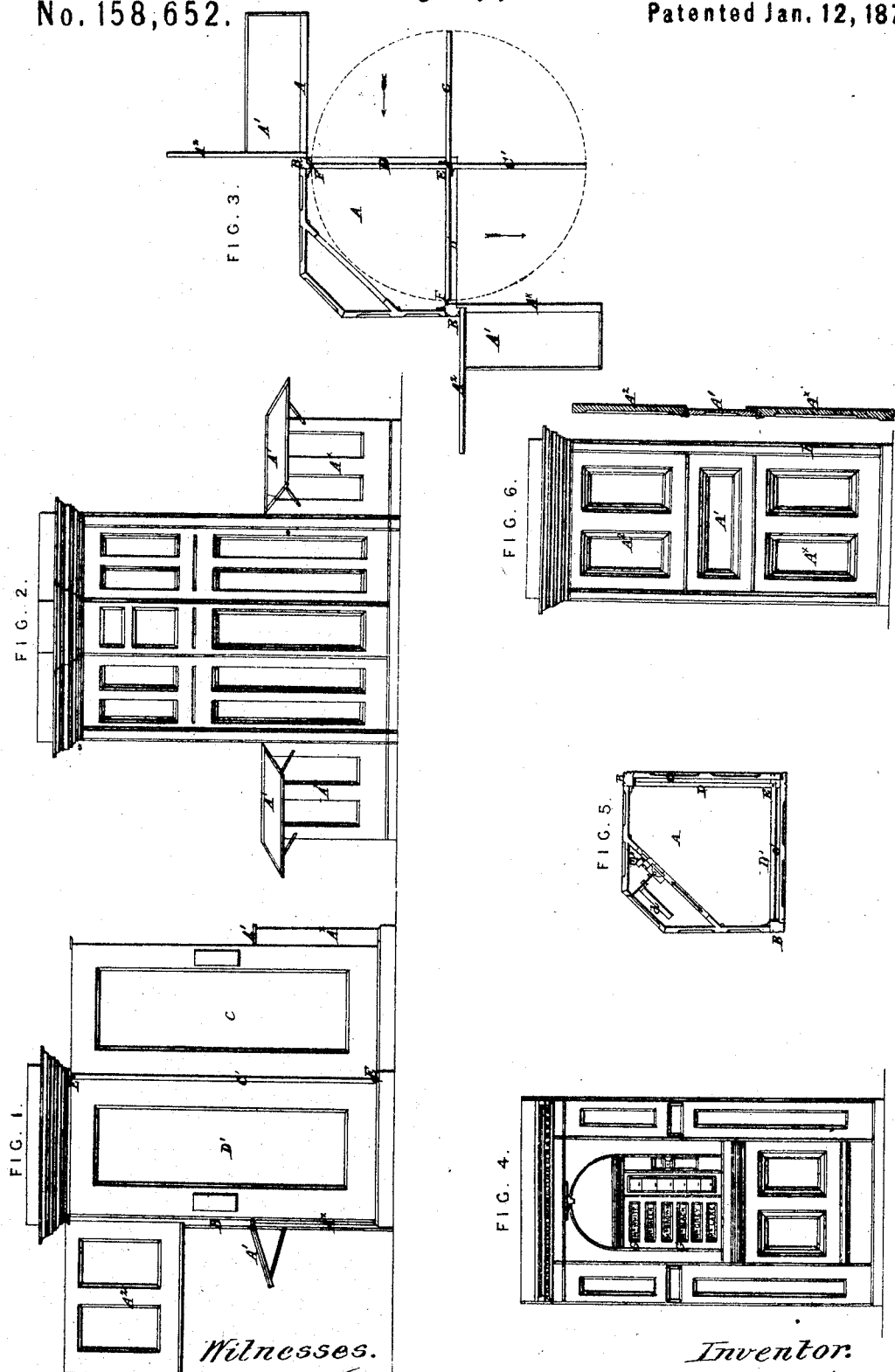

No. 158,652.

5 Sheets--Sheet 2.

Patented Jan. 12, 1875.

Witnesses.
W. Lloyd Wise
Henry Ord

Inventor.

H. W. SPRATT.
Voting-Apparatus.

No. 158,652.

5 Sheets--Sheet 4.

Patented Jan. 12, 1875.

Witnesses:
W. Loyd Wise
Henry Crd

Inventor:
Henry W. Spratt

5 Sheets--Sheet 5.
H. W. SPRATT.
Voting-Apparatus.
No. 158,652. Patented Jan. 12, 1875.
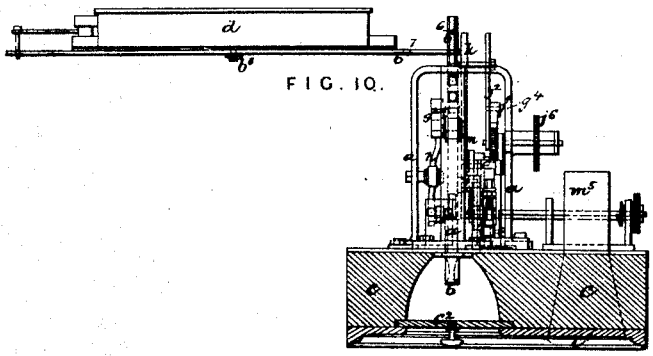
FIG. 10.
FIG. 11.
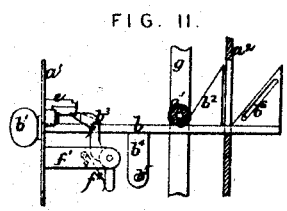
FIG. 12.
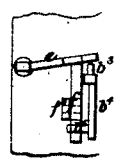
FIG. 13.
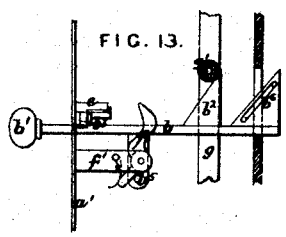
FIG. 14.
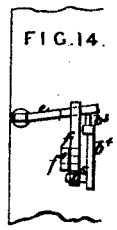
Witnesses.
Inventor:

UNITED STATES PATENT OFFICE.

HENRY W. SPRATT, OF 4 LEE ROAD, BLACKHEATH, ENGLAND.

IMPROVEMENT IN VOTING APPARATUS.

Specification forming part of Letters Patent No. 158,652, dated January 12, 1875; application filed August 10, 1874.

*To all whom it may concern:*

Be it known that I, HENRY WILLIAM SPRATT, of 4 Lee Road, Blackheath, in the county of Kent, England, Kingdom of Great Britain and Ireland, have invented an Improved Voting Apparatus, of which the following is a specification:

My invention consists in an improved voting-chamber, and mechanism therefor, which mechanism can also be applied to an existing building, or inclosed in a portable chamber for voting, and which is suitable and available for every description of voting, and for securing purity and secrecy of election, with the following advantages: First, balloting (that is, voting secretly) without the aid of balls, tickets, passes, letters, figures, official stamps, or ballot-boxes; second, absolute secrecy, it being impossible to discover for whom the voter has voted; third, while secrecy is obtained, all parties, pro and con, can be satisfied the voter has voted; fourth, at the close of the poll the result of the voting can be instantly made known; fifth, a complete check as to the numbers voted, preventing any tampering with the apparatus; sixth, economy, great saving of time, trouble, and expense at elections, and also with government officials, and office routine afterward.

In order to enable others skilled in the art to make and use my invention, I now proceed to describe the manner of carrying it into practical effect, reference being had to the accompanying drawings, and the figures and letters marked thereon.

Figure 7:
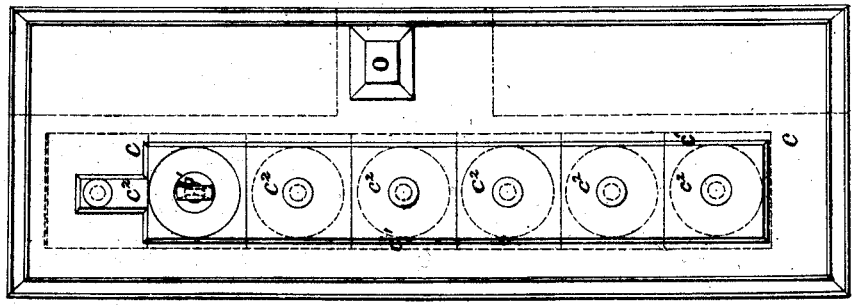
Figure 8:
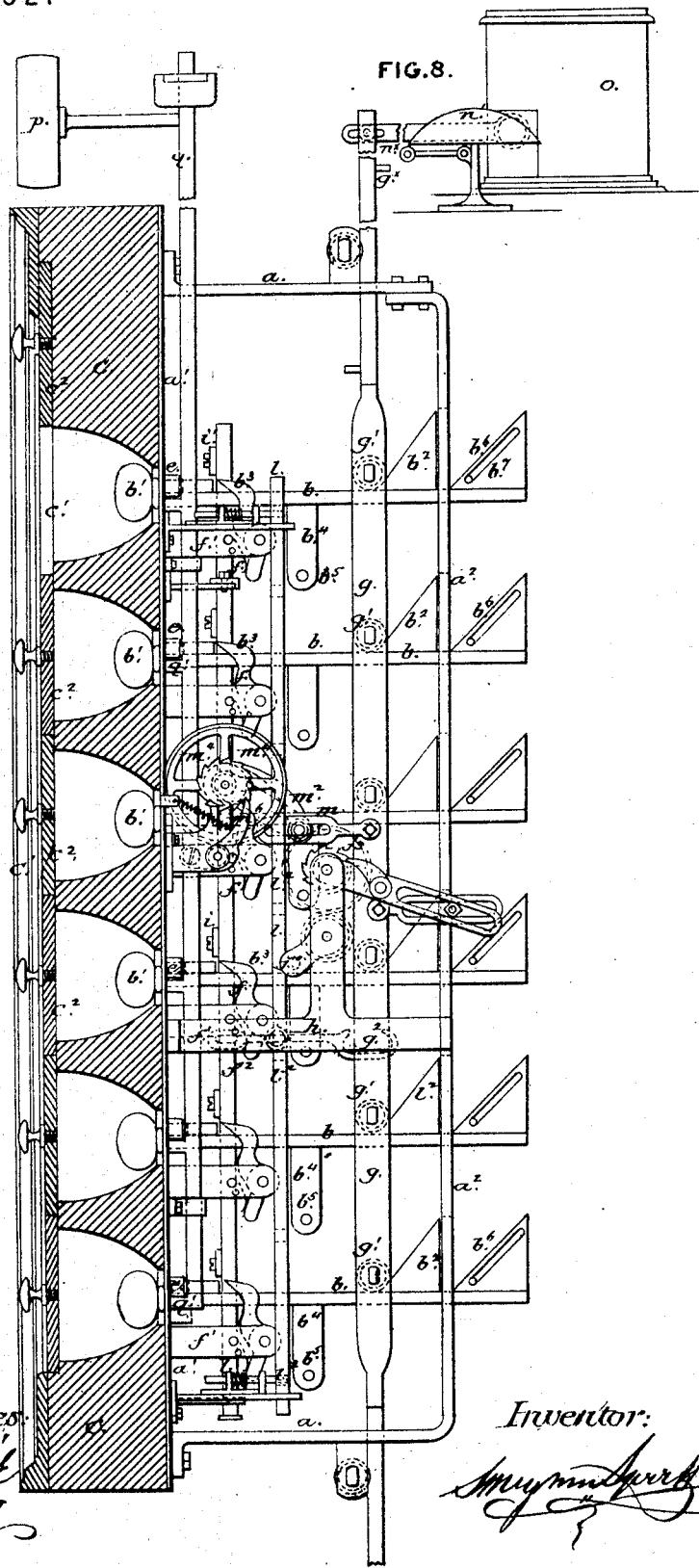
Figure 9:
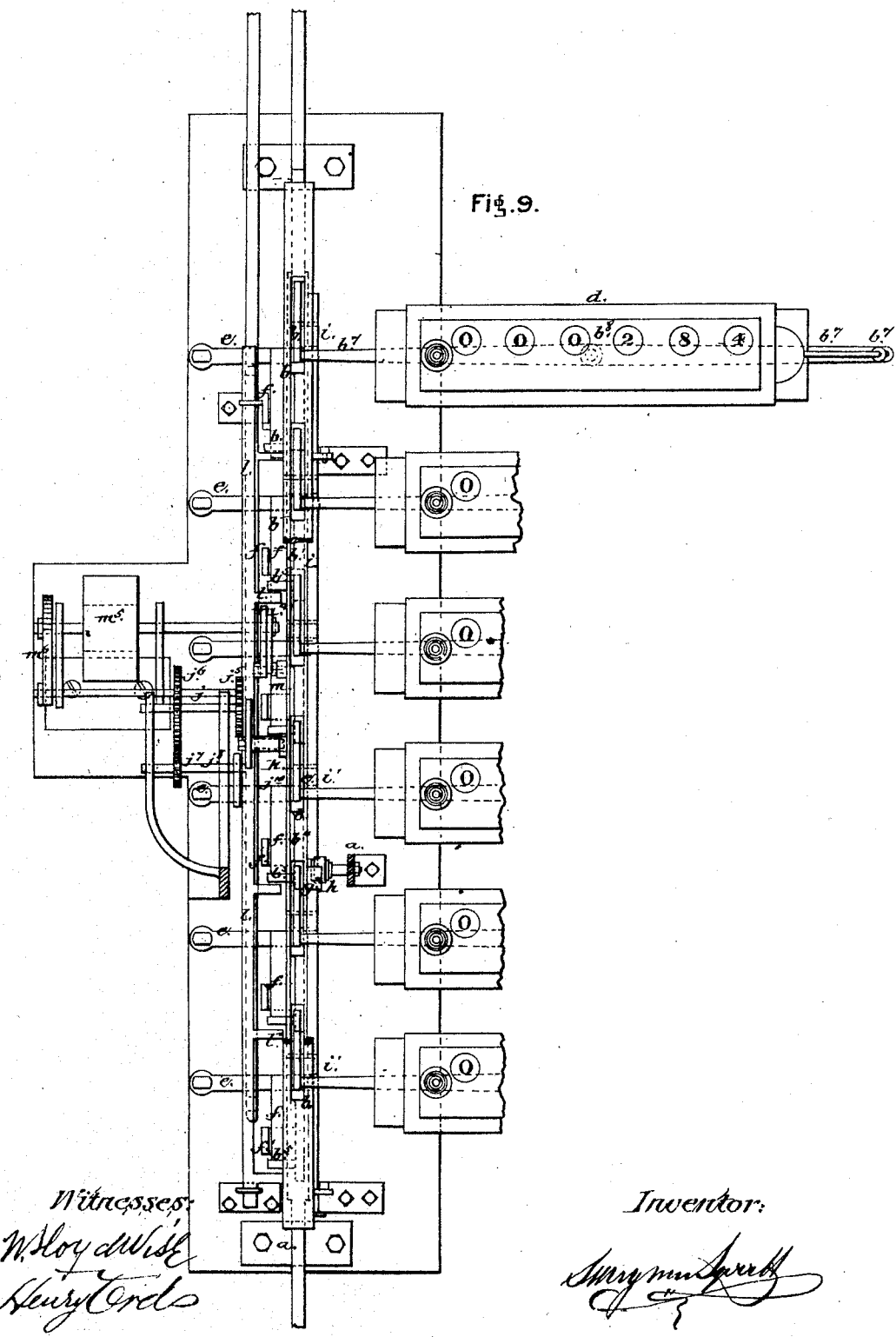

Figure 1 is a front view of my improved voting-chamber, shown open and ready for use. Fig. 2 is a back view of the same. Fig. 3 is a plan thereof. Fig. 4 is a view of the interior of the voting-chamber, as seen by the voter when he is in position for voting. Fig. 5 is a plan of the chamber as it appears when shut up. Fig. 6 is a view of the exterior when shut up. Fig. 7 is a front view to an enlarged scale of the casing for containing the voting mechanism. Fig. 8 is a side elevation of the voting mechanism, showing the knobs or handles locked. Fig. 9 is a back view thereof. Fig. 10 is a plan of the same. Fig. 11 shows in side elevation, and Fig. 12 in front view, one of the sliding bars $b$ and its locking devices when the bar is unlocked and ready to be drawn forward for giving a vote. Figs. 13 and 14 are corresponding views, showing the sliding bar drawn out.

The outer doors of the chamber A are each made in three parts, namely, a lower part, $A^\times$, hinged to a post, B, of the chamber, a middle part, $A^1$, hinged to the part $A^\times$, and an upper part, $A^2$, hinged to the post B. On being thrown back the middle portions $A^1$ form two desks for officials, the upper portions $A^2$ serving as notice-boards whereon the rules to be observed at elections may be affixed. The two inner folding-leaves C C' open on hinges, by which they are fastened to two leaves, D D', fixed together, and forming in plan an L-shaped door movable on pins or pivots at E. Thus the two inner folding leaves C C', when opened out and secured by temporary rods or otherwise at right angles to each other, and to the two fixed leaves D D', form a turnstile, as shown in plan in Fig. 3, such turnstile working on pivots in one direction only, somewhat on the principle used on toll-bridges and in public buildings. The arrows in Fig. 3 show the direction in which the turnstile illustrated is arranged to rotate, and it is prevented from being turned back by catches F arranged in the posts B, and kept forward by suitable springs. When the turnstile is turned in the direction shown by the arrows these catches F present inclined surfaces to its leaves, so that the catches are pushed in to allow the leaves to pass, but if the turnstile be turned in the contrary direction, its leaves come in contact with the flat surfaces of the catches, and are thereby arrested. It will be obvious that the turnstile may be arranged to turn in the contrary direction to that shown. G are tablets containing the names of the candidates, and opposite to each tablet is the handle or knob connected with the indicating or recording mechanism for the corresponding candidate. $a$ is the framing of the apparatus, which is constructed with a front plate, $a^1$, and a back plate, $a^2$. Each of these plates is formed with a number of holes corresponding to the number of candidates for which the machine is to be made available. The holes in the back plate are made large enough to allow of the motion of the projections containing the slots $b^6$. In these holes are fitted sliding bars $b$, provided with handles or knobs $b^1$, which handles or knobs are situated in recesses formed in the wood-work or casing $c$, as shown, so that when drawn forward the handles or knobs do not reach quite to the front of the wood-work. $c^1$ is a frame attached to the casing. In this frame are fitted a number of small sliding doors, $c^2$, and the frame is made just high enough to be capable of receiving one door more than the number with which it is provided, so that, by raising the upper door as far as it will go, access is gained to the upper handle or knob $b^1$; or, if it be desired to actuate a lower handle, $b^1$, the door opposite to the handle to be actuated is lifted, and raises all the doors above it, but the frame is not sufficiently large to allow the doors to be moved so as to permit of access to more than one handle or knob at a time. Each sliding bar $b$ is formed or provided with an incline, $b^2$, and with a stop or projection, $b^3$, as also with a projecting part, $b^4$, carrying a finger, $b^5$, for actuating the tumbler-levers, hereinafter described. The rear end of each sliding bar $b$ likewise carries an inclined slot, $b^6$, which receives one end of a lever, $b^7$, having its fulcrum at $b^8$. The other end of this lever has a slot, $b^9$, which receives the rod or lever of an indicator or recording instrument, $d$, which may be of ordinary or other suitable construction, for recording the number of movements of its rod or lever, so that every time one of the handles or knobs $b^1$, with its sliding bar $b$, is pulled forward by the voter and allowed to return to its normal position, as shown in Fig. 8, the corresponding indicator or recording instrument will register one vote. To the front plate $a^1$ are hinged or pivoted a number of locking-pieces, $e$—one to each sliding bar—and these locking-pieces are made to operate in conjunction with tumbler-levers $f$, working on pins carried by brackets $f^1$, attached to the front plate. The upper arm of each tumbler-lever $f$ is kept forward by springs $f^2$, which springs press against the lower arms of the said levers, as shown. $g$ is a vertical sliding frame, provided with anti-friction wheels $g^1$, against which the inclines $b^2$ of the sliding bars press when the sliding bars are drawn forward, thereby raising the frame $g$ during the forward or outward movement of the sliding bars $b$. When the bar $b$ that has been drawn out is released, by the voter letting go the handle or knob, the weight of the sliding frame $g$, acting through the corresponding anti-friction wheel upon the steep incline $b^2$ of the bar $b$, causes the bar to slide back to its normal position. $h$ is a lever, working on a stud carried by the frame $a$. One end of this lever is slotted to receive a projecting pin of the vertical sliding bar $i$. This bar is provided with small catches $i'$, which are attached to the bar by pins or screws, as shown. The other end of the lever $h$ is recessed to receive a pin, $g^2$, which projects from the side of the vertical sliding frame $g$. In the position shown in Fig. 8, the recessed end of the lever $h$ is held down by the pin $g^2$ of the sliding frame $g$, but when any one of the handles or knobs $b^1$ is pulled to record a vote, so as, by its sliding bar, to raise the frame $g$, the recessed end of the lever $h$ is released, and the vertical sliding bar $i$ falls by its own weight and the action of the spring $i^\times$; thus bringing one of its catches, $i'$, opposite to the stop or projection $b^3$ of every one of the sliding bars $b$, except that which is being actuated, thus, for the time, locking all the handles or knobs, except that which is drawn out. $k$ is a slotted arm attached to the vertical sliding frame $g$. The slot of this arm receives a stud, $j$, carried by a slotted lever, $j^2$, which works on a spindle, $j^3$, and carries a pawl, $j^4$, which takes into a ratchet, $j^5$, fixed on the spindle $j^3$. On the same spindle is fixed a toothed wheel, $j^6$, geared into a pinion, $j^7$, on a spindle, $j^8$, the end of which carries a crank or cam, $j^9$, which, on being actuated, as hereinafter described, moves a bar, $l$, by means of its pin $j^{10}$. This bar $l$ is for the purpose of locking the whole of the sliding bars $b$ when the voter has given the number of votes to which he is entitled. The bar $l$ is kept back by springs $l^1$ until the crank-pin $j^{10}$ comes in contact with it and moves it forward, whereupon the projecting parts $l^2$ of the bar $l$ will come in contact with the lower arms of the tumbler-levers $f$, and, by pressing them forward, will move back their upper arms, so as to let the locking-pieces $e$ fall down onto the sliding bars $b$ in front of their projecting parts $b^3$, thus locking the whole of the sliding bars. The mechanism is set for the number of votes to which each voter is entitled by shifting the stud $j$ in the slotted arm $k$, so as to give the pawl $j^4$ more or less motion, as required. The adjustable stud $j$, instead of being fitted in the arm $k$, as shown, may be fitted into a sweep or curve and allowed to work freely along it. In this case the curve is to be attached to a sliding bar, capable of being drawn in or out in suitable slides, so as to determine the position of the stud $j$ with regard to the slotted arm $k$ and the slotted lever $j^2$, the sweep or curve and the sliding bar being made adjustable by a handle-lever working over a brass quadrant with numbers engraved upon it, so that it can be readily set to any required number. The vertical sliding frame $g$ carries another slotted arm, $m$, which, through a pin, $m^1$, an arm, $m^2$, a pawl, $m^3$, and a ratchet, $m^4$, actuates a wheel, $m^5$, the periphery of which is numbered, so as to indicate to the voter the number of votes he has given. The numbered wheel $m^5$ is moved back to zero, when the voter leaves, by a spring, but is prevented from moving back prematurely by a pawl, $m^6$. This may be accomplished by any suitable arm or connection, which may be arranged to be actuated by the projections on the upper portions of the leaves of the turnstile, and release the ratchet from the influence of the pawl. The parts being in the position shown in Figs. 11 and 12, the voter entering raises the door $c^2$, opposite which the name is written of the candidate he wishes to vote for. He then pulls the handle or knob, which is thereby exposed to his view, thus drawing forward the sliding bar $b$, which actuates its indicating or counting machine so as to record one vote. The sliding frame $g$, by its upward and return movements, also actuates the public index or recording-machine $o$, so as to publicly register that the vote has been given, without, however, indicating for whom it has been given. $n$ is a tongue or short arm, which allows the projection $g^x$ of the frame $g$ to move up freely, but, as the frame afterwards falls, its projection $g^x$ draws down the tongue $n$ and the arm it is attached to, so ringing the bell, not shown. If the voter be entitled to more than one vote he may give it, the apparatus being set accordingly, but if not, all the handles or knobs will be locked by the action of the mechanism, as hereinbefore described. As the voter leaves the voting-chamber a suitable arm, one of which projects from each of the four leaves of the turnstile, will actuate a suitable connection, not shown, thereby moving up the bar $q$, the projections $q'$ of which will raise the locking-pieces $e$ into the position shown in Figs. 11 and 12, thus unlocking the sliding bar $b$ and setting the apparatus ready for the voter.

From the foregoing description it will be understood that, by my invention, for parliamentary or single voting, the voter, by one movement of the handle or knob, effects six objects—that is to say, he first locks all the other handles or knobs; secondly, records one vote on the index or recording instrument of the candidate he has selected; thirdly, records one vote on the inside tell-tale index-wheel, which is for proving to the voter the vote or votes he has given; fourthly, registers one vote on the public index or recording instrument, which will check the total number of votes given to the several candidates, thus guarding against any tampering with the candidates, indexes or recording instruments; fifthly, strikes or rings a bell, notifying that a vote has been given and that the act of voting has been completed; sixthly, actuates the entire locking apparatus, which may be fixed to lock for a single vote or for any given number of votes.

For cumulative voting, the attendant will, after each vote, arrange the mechanism, hereinbefore described, to enable the voter simply to repeat the voting operation, and he may thus vote entirely for one candidate, or split his vote, if he pleases. When, however, he has voted the number of times to which he is entitled he can vote no more, being prevented from so doing, whether in parliamentary or cumulative voting, by the automatic locking of the apparatus, which can only be unlocked by the action of the turnstile, or the doors thereof, as the voter leaves, or when a fresh voter enters the voting-chamber, as hereinbefore described. If the voter does not leave the voting-chamber as soon as he has fully voted, the turnstile—being revolved by the official in attendance, or by the entrance of the succeeding voter, as soon as the bell has notified the completion of the voting operation by the voter in the chamber—will gently eject the last-named voter.

It will be obvious that, to suit different situations, the handles or knobs of the apparatus may either be made to turn—for instance, by being placed on spindles at right angles to the sliding bars $b$, such spindles being provided with pinions geared into racks on the ends of the said sliding bars— or the handles or knobs may be made to pull up, or to pull down, by being attached to vertical sliding bars carrying inclined slots, to work the sliding bars $b$ through suitable pins; or by turning the apparatus back to front, and fixing the handles or knobs on what constitute the rear ends of the bars $b$ in the drawing.

It will be obvious that the apparatus may be actuated by pressing in the handles or knobs.

The unlocking-bar $q$, instead of being worked as shown in the drawings, may be raised from below by a bell-crank having its horizontal arm connected to the lower end of the bar. In this case, as the voter turns the turnstile, projecting pins or studs, projecting from the pivot of the turnstile, will come in contact with one end of a lever of the first order, arranged beneath the flooring of the voting-chamber, and will cause the other end of this lever to move the vertical arm of the bell-crank, thus raising the end of its horizontal arm, and, consequently, also temporarily raising the unlocking-bar $q$. The lever is moved back by a spring, and the unlocking-bar falls by its own weight.

Instead of the arrangement shown in the drawings for actuating the locking-bar $l$, the apparatus may be modified so as to make the index-wheel $m^5$ serve that purpose. In this case a larger wheel will be used, and provided with holes or other means, at suitable intervals in its side, to receive and hold a pin or inclined projection, arranged to come in contact with, and move the bar $l$ as the wheel rotates, so as to move the said bar, and effect the locking when the voter has given the number of votes for which the pin or projection has been previously set.

The voting may be telegraphed, by self-acting and automatic apparatus, from any one station, or from several stations, to a central station, at which the final result is to be declared.

Having described my invention and the manner of performing it, I hereby declare what I consider to be novel and original, and therefore desire to have secured to me by Letters Patent, to be—

1. The arrangement, in connection with the indicators or recording-instruments $d$, of the sliding bars $b$, with their knobs or handles $b^1$ in recesses provided with sliding doors $c^2$, as described, so as to prevent access to more than one handle or knob at a time, as herein set forth.

2. The sliding bars $b$, formed or provided with inclines $b^2$, stops or projections $b^3$, and projecting parts $b^4$, carrying-fingers $b^5$, in combination with the locking-pieces $e$, tumbler-levers $f$, and their springs $f^2$, the whole arranged and operating together substantially as described, for the purposes specified.

3. The combination, with the sliding bars $b$, of the sliding frame $g$ and its anti-friction wheels $g^1$, raised, by the inclines $b^2$, during the forward movements of the bars $b$, the said frame being arranged, in combination with the other parts, as described, so as by its upward and return movements to actuate the public index or recording-machine $o$, ring the bell $n^1$, and return the bar $b$, by which it has been raised, to its normal position, as herein set forth.

4. The combination, with the sliding bars $b$, of the vertical sliding bar $i$, provided with catches $i^1$, and the sliding bar $g$, whereby when one bar is drawn out all the others are locked until the bar drawn out is released, whereupon the unlocking is effected, during its return, by the action upon the lever $h$ of the pin $g^2$ of the sliding frame $g$, as above described.

5. The combination, with the tumbler-levers $f$, locking-pieces $e$, and sliding bars $b$, of the locking-bar $l$, arranged to be moved by the crank-pin $j^{10}$, actuated as hereinbefore described, for locking the whole of the sliding bars $b$ when the voter has given the number of votes to which he is entitled.

6. In combination with the sliding frame $g$ and locking-bar $l$, the slotted arm $k$, stud $j$, slotted lever $j^2$, spindle $j^3$, pawl $j^4$, ratchet $j^5$, toothed wheel $j^6$, pinion $j^7$, spindle $j^8$, crank or cam $j^9$, and pin $j^{10}$, all arranged and operating together substantially as and for the purposes herein described and set forth.

7. The combination, with the sliding bars $b$ and sliding frame $g$, of the slotted arm $m$, pin $m^1$, arm $m^2$, pawl $m^3$, ratchet $m^4$, and index-wheel $m^5$, arranged to indicate to the voter the number of votes he has given, and also of suitable connections, (not shown,) actuated by the projections on the turnstiles, which will allow the wheel $m^5$ to return to zero as he leaves the voting-chamber, all substantially as herein described.

8. The combination, with the locking-pieces $e$ and sliding bars $b$, of the unlocking-bar $q$, arranged to be actuated by an arm or connection (not shown) carried by, or connected with, the turnstile, so as to unlock the sliding bars $b$ as the voter leaves the voting-chamber, substantially as described.

HENRY WM. SPRATT.

Witnesses:
W. LLOYD WISE, *Patent Agent, London.*
HENRY ORD, *Gentleman, London.*